United States Patent
Bruno

(10) Patent No.: US 11,282,081 B2
(45) Date of Patent: Mar. 22, 2022

(54) AUTHENTICATION VIA BIOMETRIC PASSPHRASE

(71) Applicant: American Express Travel Related Services Company, Inc., New York, NY (US)

(72) Inventor: John Bruno, Scottsdale, AZ (US)

(73) Assignee: American Express Travel Related Services Company, Inc., New York, NY (US)

(*) Notice: Subject to any disclaimer, the term of this patent is extended or adjusted under 35 U.S.C. 154(b) by 208 days.

(21) Appl. No.: 16/587,929

(22) Filed: Sep. 30, 2019

(65) Prior Publication Data

US 2020/0104855 A1    Apr. 2, 2020

Related U.S. Application Data

(63) Continuation of application No. 14/280,985, filed on May 19, 2014, now Pat. No. 10,438,204.

(51) Int. Cl.
*G06Q 20/40* (2012.01)

(52) U.S. Cl.
CPC .............. *G06Q 20/40145* (2013.01)

(58) Field of Classification Search
CPC ................................................ G06Q 20/40145
(Continued)

(56) References Cited

U.S. PATENT DOCUMENTS

| | | | |
|---|---|---|---|
| 5,933,515 A * | 8/1999 | Pu | G06K 9/00006 382/124 |
| 7,685,629 B1 | 3/2010 | White et al. | |

(Continued)

FOREIGN PATENT DOCUMENTS

| | | |
|---|---|---|
| WO | 0232308 | 4/2002 |
| WO | 2002032308 | 4/2002 |

OTHER PUBLICATIONS

European Search Report dated Sep. 30, 2016 in EP Application No. 15787888.5.

(Continued)

*Primary Examiner* — Olabode Akintola
*Assistant Examiner* — Paul R Kloberg
(74) *Attorney, Agent, or Firm* — Thomas | Horstemeyer LLP

(57) ABSTRACT

A system, method and computer program product for granting access and/or an authorization are disclosed. For instance, a computer-implemented method may include receiving a first sequence of plurality of biometric data elements. The sequence of plurality of biometric data elements may comprise a biometric passphrase. The method may include registering the biometric passphrase to a known user and/or a transaction account. The method may include receiving a transaction request comprising a second sequence of plurality of biometric data elements. The method may include comparing the second sequence of plurality of biometric data elements to the biometric passphrase to resulting in a confidence factor of the comparison. The comparison may include comparing the sequencing of the second sequence of plurality of biometric data elements and the characteristics of each biometric data element of the second sequence of plurality of biometric data elements to the biometric passphrase.

19 Claims, 8 Drawing Sheets

(58) Field of Classification Search
USPC .......................................................... 704/44
See application file for complete search history.

(56) References Cited

U.S. PATENT DOCUMENTS

| | | | | | |
|---|---|---|---|---|---|
| 8,205,256 | B2* | 6/2012 | Ahn | ...................... | G06F 21/564 726/22 |
| 8,494,142 | B2* | 7/2013 | Lingafelt | ............ | H04L 12/1822 379/202.01 |
| 8,595,804 | B2* | 11/2013 | Pratt | ...................... | G06F 21/32 726/5 |
| 8,607,319 | B2* | 12/2013 | Peirce | ................ | G06K 9/00926 726/6 |
| 8,613,052 | B2* | 12/2013 | Weiss | ................... | G06Q 20/206 726/4 |
| 8,645,222 | B1* | 2/2014 | Tamassia | ............... | G06Q 30/02 705/26.1 |
| 8,660,322 | B2* | 2/2014 | Tsai | ...................... | G06K 9/685 382/118 |
| 8,718,335 | B2* | 5/2014 | Mason | ................... | G06F 21/32 382/117 |
| 8,786,403 | B1* | 7/2014 | Vangemert | ......... | G06K 9/00053 340/5.83 |
| 8,836,473 | B2* | 9/2014 | Wadia | ................... | G07F 7/1041 340/5.53 |
| 8,868,036 | B1* | 10/2014 | Nasserbakht | ......... | H04L 63/083 455/410 |
| 9,218,474 | B1* | 12/2015 | Roth | ...................... | G06F 21/32 |
| 2005/0111709 | A1* | 5/2005 | Topping | ................... | G07C 9/37 382/124 |
| 2007/0175986 | A1 | 8/2007 | Petrone et al. | | |
| 2008/0005980 | A1 | 3/2008 | Yoshioka et al. | | |
| 2008/0059805 | A1* | 3/2008 | Yoshioka | ............ | G06K 9/6255 713/186 |
| 2008/0205714 | A1* | 8/2008 | Benkley | ............. | G06K 9/00026 382/126 |
| 2008/0226132 | A1* | 9/2008 | Gardner | ............ | G06K 9/00026 382/107 |
| 2009/0010503 | A1* | 1/2009 | Mathiassen | .......... | G06Q 20/341 382/125 |
| 2010/0030578 | A1* | 2/2010 | Siddique | ................ | G06Q 40/12 705/3 |
| 2010/0094866 | A1* | 4/2010 | Cuttner | ................ | G06F 16/735 707/723 |
| 2010/0125516 | A1* | 5/2010 | Wankmueller | ......... | G06Q 40/00 705/35 |
| 2012/0169613 | A1* | 7/2012 | Armstrong | ............ | G06F 3/0233 345/173 |
| 2012/0250954 | A1* | 10/2012 | Nada | .................. | G06K 9/00087 382/124 |
| 2013/0051632 | A1* | 2/2013 | Tsai | ...................... | G06K 9/685 382/118 |
| 2013/0212022 | A1* | 8/2013 | Lane | .................... | G06Q 20/327 705/44 |
| 2013/0232073 | A1 | 9/2013 | Sheets et al. | | |
| 2013/0329967 | A1* | 12/2013 | Abiko | ................ | G06K 9/00006 382/115 |
| 2014/0139318 | A1* | 5/2014 | Malpani | .................. | G06F 21/32 340/5.82 |

OTHER PUBLICATIONS

Office Action dated May 24, 2019 in EP Application No. 15787888.5.
Notice of Allowance dated May 21, 2019 in U.S. Appl. No. 14/280,985.
Non-Final Office Action dated Nov. 15, 2018 in U.S. Appl. No. 14/280,985.
Advisory Action dated Sep. 25, 2018 in U.S. Appl. No. 14/280,985.
Final Office Action dated Aug. 10, 2018 in U.S. Appl. No. 14/280,985.
Non-Final Office Action dated Mar. 26, 2018 in U.S. Appl. No. 14/280,985.
Advisory Action dated Dec. 13, 2017 in U.S. Appl. No. 14/280,985.
Final Office Action dated Nov. 3, 2017 in U.S. Appl. No. 14/280,985.
Non-Final Office Action dated May 2, 2017 in U.S. Appl. No. 14/280,985.
Advisory Action dated Nov. 28, 2016 in U.S. Appl. No. 14/280,985.
Final Office Action dated Oct. 6, 2016 in U.S. Appl. No. 14/280,985.
Non-Final Office Action dated Apr. 11, 2016 in U.S. Appl. No. 14/280,985.
International Preliminary Report on Patentability dated Oct. 28, 2015 in PCT Application No. PCT/US2015/024881.
International Search Report and Written Opinion dated Jul. 23, 2015 in PCT Application No. PCT/US2015/024881.
Extended European Search Report dated Sep. 30, 2016 in European Application No. 15787888.5.
International Preliminary Report on Patentability dated Oct. 28, 2015 in Application No. PCT/US2015/024881.
International Search Report and Written Opinion dated Jul. 23, 2015 in Application No. PCT/US2015/024881.

* cited by examiner

AUTHENTICATION VIA BIOMETRIC PASSPHRASE

CROSS REFERENCE TO RELATED APPLICATIONS

This application is a continuation of, claims priority to and the benefit of, U.S. Ser. No. 14/280,985 filed May 19, 2014 and entitled "AUTHENTICATION VIA BIOMETRIC PASSPHRASE," which is hereby incorporated by reference in its entirety for all purposes.

FIELD

The present disclosure generally relates to financial transactions, and more particularly, a system and method of processing financial transactions using biometrics.

BACKGROUND

Biometric authentication (e.g., fingerprint biometric authentication on mobile devices in the payment context) has gained some popularity recently with the advent of the Fast Identity Online (FIDO) standard and adoption by various peer-to-peer payment providers in their online checkout flow. Biometrics are powerful authentication methods; however; biometric identifiers carry an underappreciated danger when the signature that identifies "you" is compromised. The danger is a far greater threat than simply losing a password.

A common perception is that fingerprint authentication is relatively secure, however; this is often not the case. Fingerprints are unwittingly left accessible in public areas, such as by merely touching objects. Moreover, facsimiles of one's fingerprint can be easily and quickly reproduced to spoof fingerprint reading devices. This poses a security risk for those who lose track of a fingerprint authentication device, as systems can be compromised. What is needed is a convenient, unique personal identifier whose use is insulated from misuse.

SUMMARY

The present disclosure meets the various needs described above by providing a system, method and computer program product for granting access and/or an authorization. For instance, a computer-implemented method may include receiving a first sequence of a plurality of biometric data elements. The sequence of plurality of biometric data elements may comprise a biometric passphrase. The method may include registering the biometric passphrase to a known user and/or a transaction account. The method may include receiving a transaction request comprising a second sequence of plurality of biometric data elements. The method may further include comparing the second sequence of the plurality of biometric data elements to the biometric passphrase, resulting in a confidence factor of the comparison. The method may also include authorizing the transaction request based on the confidence factor of the comparison of the second sequence of the plurality of biometric data elements, with the registered biometric passphrase being above a threshold. The comparison may include comparing the sequencing of the second sequence of plurality of biometric data elements and the characteristics of each biometric data element of the second sequence of plurality of biometric data elements, to the biometric passphrase.

BRIEF DESCRIPTION OF THE DRAWINGS

The features and advantages of the present disclosure will become more apparent from the detailed description set forth below when taken in conjunction with the drawings. The left-most digit of a reference number identifies the drawing in which the reference number first appears.

DETAILED DESCRIPTION

Figure 1:
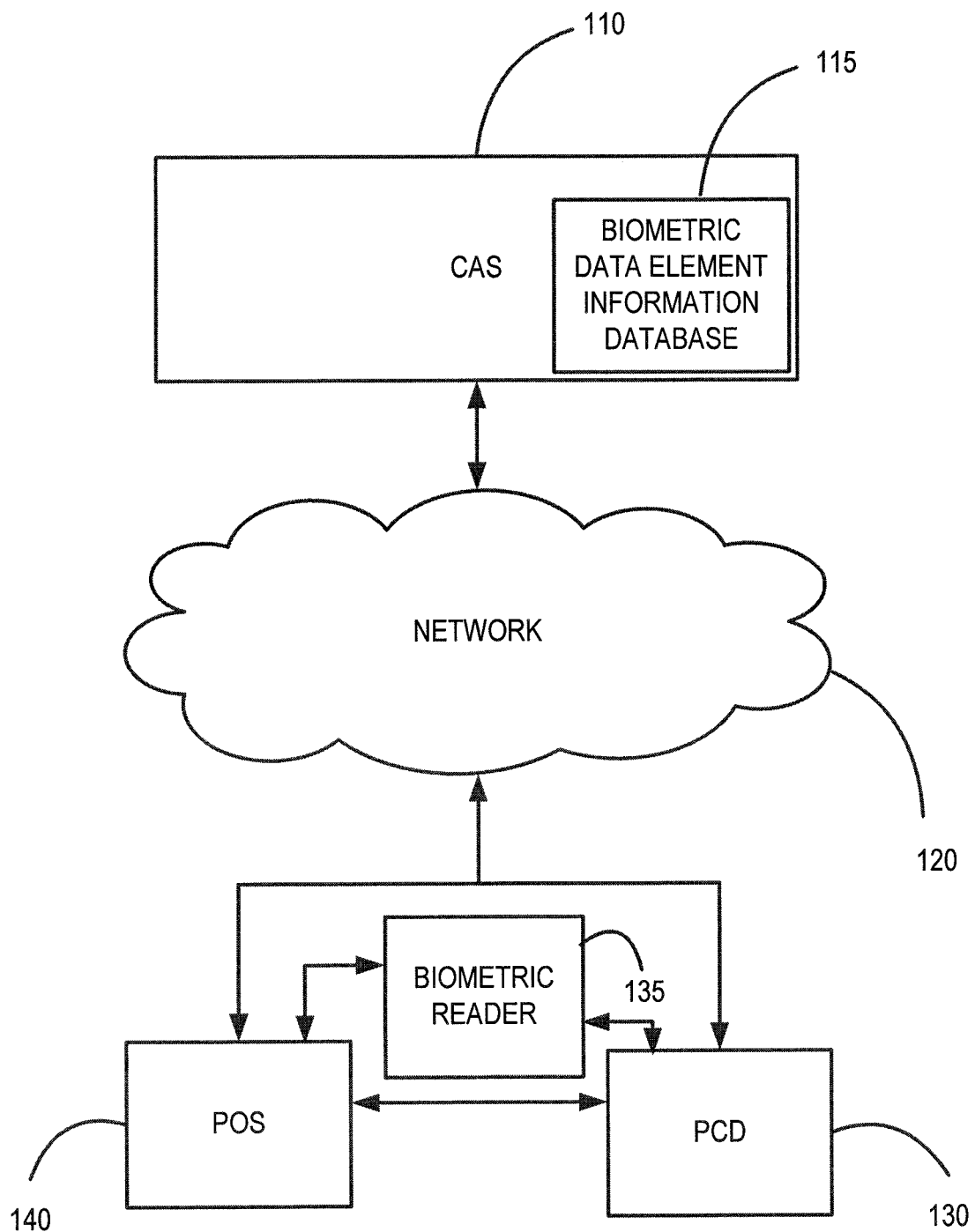
FIG. 1 illustrates a block diagram of a system for processing transactions using a biometric passphrase according to various embodiments of the disclosure.

The detailed description of exemplary embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

The phrases consumer, customer, user, account holder, cardmember or the like shall include any person, entity, business, government organization, business, software, hardware, machine associated with a transaction account, buys merchant offerings offered by one or more merchants using the account and/or who is legally designated for performing transactions on the account, regardless of whether a physical card is associated with the account. For example, the cardmember may include a transaction account owner, a transaction account user, an account affiliate, a child account user, a subsidiary account user, a beneficiary of an account, a custodian of an account, and/or any other person or entity affiliated or associated with a transaction account.

The present disclosure meets the various needs described above by providing a system, method and computer program product for a biometric passphrase. A biometric passphrase as used herein may refer to a combination of unique biometric signature elements used to identify a user and/or transaction account.

Conventionally, minimizing fraud included the use of a personal identification code (e.g., PIN) which may be managed through the use of international standards (e.g., ISO 9564). For instance, at the time of the transaction, a consumer's transaction instrument may be presented to, inserted into, swiped and/or interface with a transaction instrument reader. The reader extracts certain data from the transaction instrument, such as an account code and/or number. The transaction instrument reader then requests the user enter his or her personal identification code on a special keypad sometimes called a PinPad or personal identification code reader. The personal identification code may be immediately encrypted and secured. The secured personal identification code data is then transmitted through secure means to an authorization location, such as an authorization computer, where the transaction account holder data is stored.

At the authorization computer, the account identification data is used to securely lookup or calculate the personal identification code for the account, to verify that the personal identification code entered by the cardholder is correct. This approach minimizes fraud because the person in possession of the card must also know the secret personal identification code to complete the transaction. However, the personal identification code is traditionally limited to a string of numbers, upper and lowercase letters, and/or keyboard symbols that are readily accessible to the general public, including hackers.

In contrast to this conventional approach, the biometric passphrase may include a combination of several unique biometric data elements that are specific to a user. Thus, the biometric passphrase limits the availability of the characters for misuse. The unique biometric data elements to be used as authentication data may comprise, for example, a specific utterance of a specific user's voice, a fingerprint, facial scan, ear scan, vascular pattern, DNA sample, hand geometry, olfaction, keystroke/typing style, retinal data and/or any other biometric relating to recognition based upon any body part, function, system, attribute and/or other characteristic, or any portion thereof.

Systems, methods, and articles of manufacture capable of processing a transaction using a biometric passphrase are disclosed herein. In various embodiments, a portable consumer device may contain, obtain and/or download an authorization application. This authorization application may be configured to securely store and/or capture and transmit biometric data element information. The authorization application may be configured to allow a transaction to be initiated and/or proceed. In various embodiments, the authorization application may be configured to associate and/or append biometric passphrase data to a transaction request as part of a fraud prevention process. For instance, a user may register with an authorization system such that an authorization system may link and/or associate a plurality of biometric data elements and/or a sequence of biometric data elements to a user profile. The user profile may be associated with one or more transaction accounts. This pre-stored sequence of biometric data element information may be compared against, as part of an authorization process, such as a transaction authorization process.

In conjunction with registration, a user may store biometric characteristics as individual biometric data elements. In this way, a user may create a dictionary of biometric data elements to later utilize as his biometric passphrase. For instance, a user may be requested by a program (e.g., authorization application) to provide a fingerprint for each finger and/or to speak a variety of phrases. This individualized dictionary of biometric data elements may be stored by an authorization system or locally for easily manipulation and changing of a biometric passphrase. According to various embodiments, a user may select digits of the individualized biometric dictionary to comprise his passphrase and/or store new biometric data elements as desired. The user may change his biometric passphrase at any time.

According to various embodiments, a portable consumer device may transmit a transaction account number and a biometric passphrase, read by biometric reader, to a merchant point of sale (POS) system (e.g., a virtual POS system) to create a transaction request. A merchant may transmit a transaction request to the account authorization system. The account authorization system may compare the transaction account number and the biometric passphrase with information stored in a database. The account authorization system may transmit an authorization message to the merchant.

Referring to FIG. 1, a system for processing payments using a biometric passphrase is illustrated according to various embodiments. The system may comprise an Account/Card Authorization System ("CAS") 110, Network 120, a Portable Consumer Device ("PCD") 130 and/or a biometric reader 135, and a merchant Point of Sale device ("POS") 140. The various system components may communicate via network 120.

In various embodiments, CAS 110 (also known as an account authorization system) may be capable of or configured to perform all or part of an authorization process in relation to a payment transaction associated with a transaction account. CAS 110 may comprise any combination of hardware and software, such as servers, databases, firewalls, computers, etc., in order to authorize transactions. In various embodiments, CAS 110 may be operated by a payment processor (e.g., transaction account issuer). CAS 110 may comprise and/or be in electronic communication with a biometric database 115 configured for storing and comparing biometric data element information.

Network 120 may include any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem, Dish networks, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

PCD 130 may comprise any device capable of interacting with Network 120. In various embodiments, PCD 130 may comprise a cellular phone. However, in various embodiments PCD 130 may comprise a smart card, PDA, laptop, personal computer, GPS device, car navigation system, web client, or any other device. PCD 130 may comprise and/or be coupled to a biometric reader 135. PCD 130 may store biometric data elements. Various types of web clients which may function as a PCD 130 are described in further detail herein.

Biometric reader 135 may be any desired biometric reader configured to extract and/or manipulate a biometric characteristic into a biometric data element, such as a fingerprint scanner, microphone/voice recognition capture device, camera, and/or a retinal scanner. Biometric reader 135 may be coupled to PCD 130 and/or POS 140. Biometric reader 135 may be a stand-alone biometric reader coupled to other electronic devices via a network 120.

POS 140 may comprise any combination of hardware and/or software capable of facilitating a transaction between a sender and a recipient, such as a consumer and a merchant. In various embodiments, POS 140 may comprise a cash register at a brick and mortar store. However, in various embodiments, POS 140 may comprise a website. POS 140 may comprise a gateway as described in further detail herein. POS may also comprise a PCD similar to PCD 130.

In various embodiments, PCD 130 and/or biometric reader 135 may sync with CAS 110 to communicate biometric data element information. In various embodiments, PCD 130 may store biometric data elements. In various embodiments, for even greater security, PCD 130 may only download or upload biometric data element information in response to a user inputting verification information into PCD 130. In various embodiments, PCD 130 may transmit a request to reset the biometric passphrase to CAS 110.

In various embodiments, a consumer may initiate the transaction application on PCD 130. The consumer may initiate the transaction application in a variety of ways, including tapping or clicking a button or other visual display, or by making a sound, such as a voice command. The authorization application may request that the consumer enter verification information in the form of a biometric passphrase.

Figure 2:
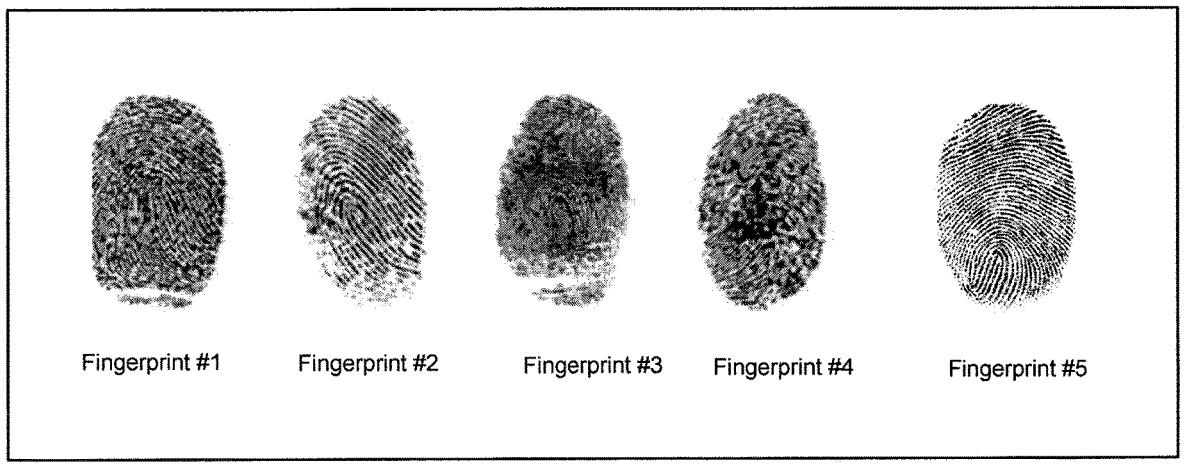
FIGS. 2-7 depict examples of various biometric passphrases according to various embodiments of the disclosure.

In various embodiments, and with reference to FIG. 2, the biometric passphrase may include a plurality of biometric data elements, such as multiple distinct fingerprints in succession (e.g., a 5 digit pass phase of the user's right hand index finger, fingerprint #1; the user's right hand index finger, fingerprint #2; the user's right hand second finger, fingerprint #3; the user's left hand index finger, fingerprint #4; the user's right hand pinky, fingerprint #5). The biometric data elements may be conceptualized as "digits" that can be used in a desired order providing at least a second order of authentication that begets increased security as compared with keyboard characters. The biometric identifiers that uniquely identify a user may be combined into a changeable biometric passphrase. The biometric passphrase may be any desired length over a preset minimum, such as more than 1 biometric data element. In this way, an additional layer of complexity is introduced for those that wish to reverse engineer a biometric passphrase, such as a hacker. The biometric reader 135 may present the user with an indicator to alert the user that it has registered a biometric data element and is ready to accept an additional biometric data element. The indicator may be haptic, visual, and/or auditory. The biometric reader 135 may be programed to wait a desired time interval between taking biometric readings. In this way, a biometric passphrase of multiple biometric data elements may be entered in via a single biometric reader. In various embodiments, in response to a successful creation of a biometric data element from a biometric characteristic, the biometric reader 135 may be ready to accept and/or create an additional biometric data element. In response to a user using a second input device (e.g., a second biometric reader or keyboard), the system may store the biometric data elements in the order in which they were received for comparison against both the pre-stored biometric data elements and their sequencing.

Figure 3:
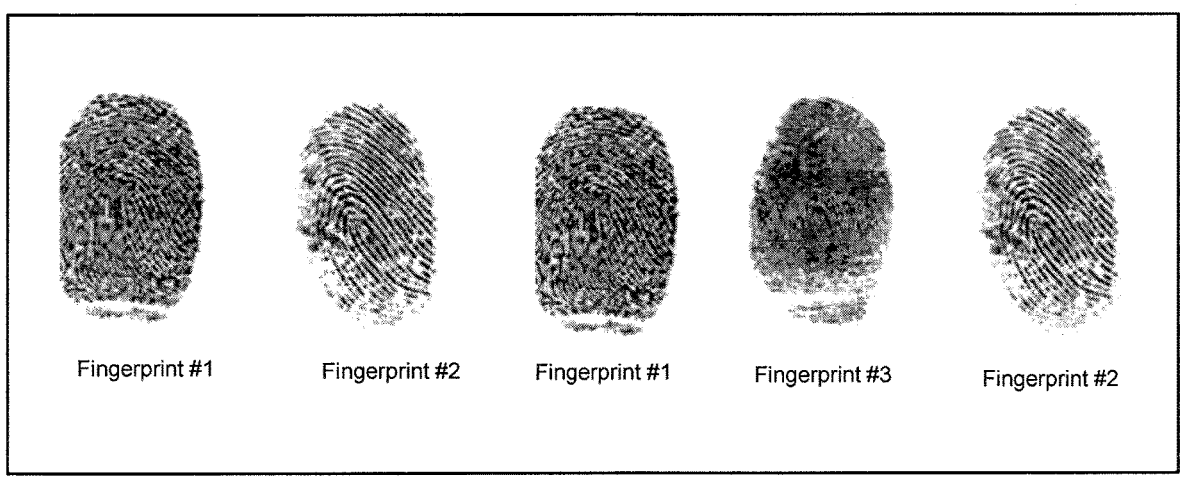

In various embodiments, and with reference to FIG. 3, the biometric passphrase may include a plurality of biometric data elements, such as multiple fingerprints in succession (e.g., a 5 digit pass phase of the user's right hand index finger, fingerprint #1; the user's right hand index finger, fingerprint #2; user's right hand index finger, fingerprint #1, the user's right hand second finger, fingerprint #3; the user's right hand index finger, fingerprint #2). For instance, the biometric data elements may be used multiple times within the same biometric passphrase.

Figure 4:
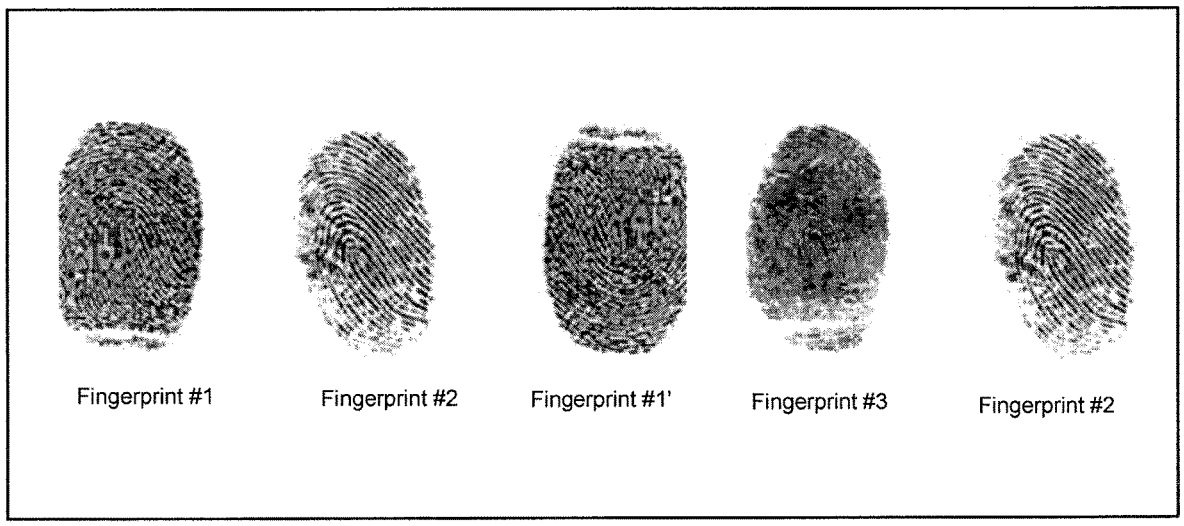

In various embodiments, and with reference to FIG. 4, the orientation of the captured biometric data elements may be particular to the biometric passphrase. Stated another way, according to various embodiments, the biometric passphrase combinations may include multiple district biometric data element types entered in a particular orientation or manner. For instance, the passphrase may include a plurality of biometric data elements, such as multiple fingerprints in succession (e.g., a 5 digit pass phase of the user's right hand index finger, fingerprint #1; the user's right hand index finger, fingerprint #2; user's right hand index finger inverted with respect to the way it was presented to the biometric reader 135 as fingerprint #1, fingerprint #1', the user's right hand second finger, fingerprint #3; the user's right hand index finger, fingerprint #2). In this way, an additional layer of complexity is introduced for those that wish to reverse engineer a biometric passphrase.

Figure 5:
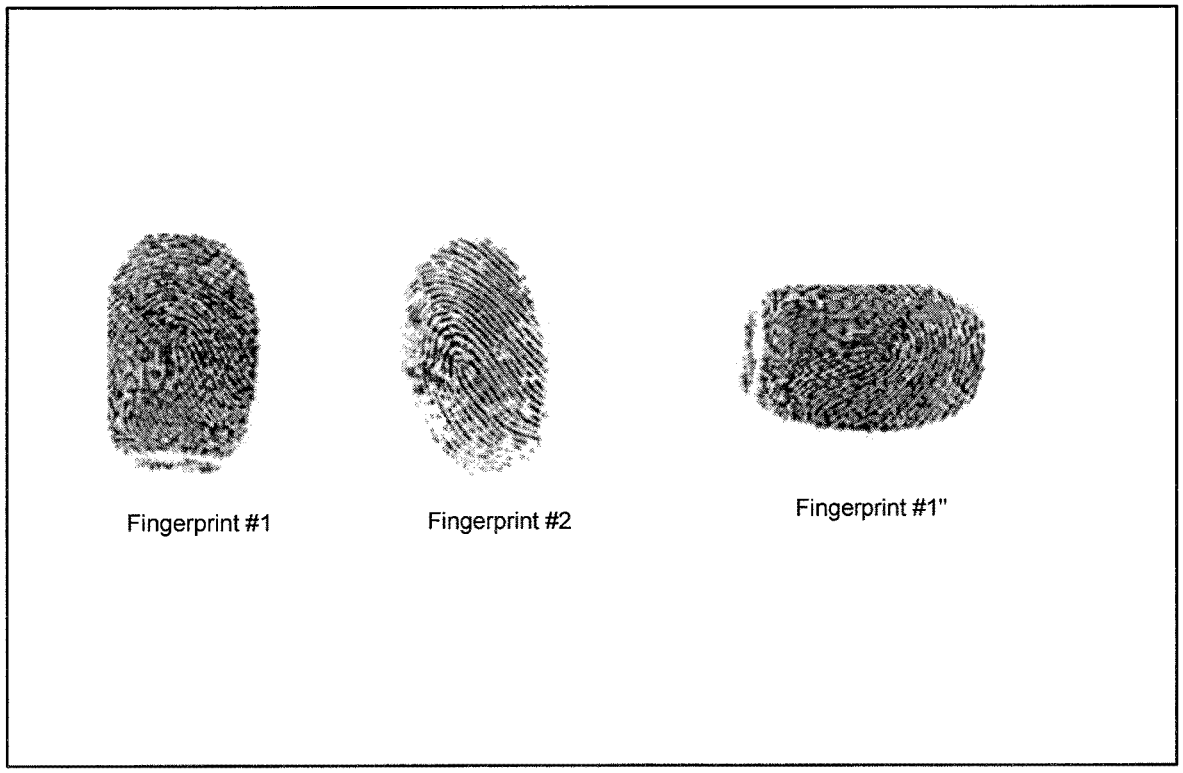

Similar to the example depicted in FIG. 4, in various embodiments, and with reference to FIG. 5, the biometric passphrase may include a plurality of biometric data elements, such as multiple fingerprints in succession (e.g., a 3 digit pass phase of the user's right hand index finger, fingerprint #1; the user's right hand index finger, fingerprint #2; user's right hand index finger rotated 90 degrees in the clockwise direction with respect the presentation of fingerprint #1, fingerprint #"). Though any angle of presentation of a biometric character, such as a fingerprint, is contemplated, rotating the biometric character for presentation to biometric reader any amount of degrees (90, 180, 270 degrees) is contemplated herein.

Figure 6:
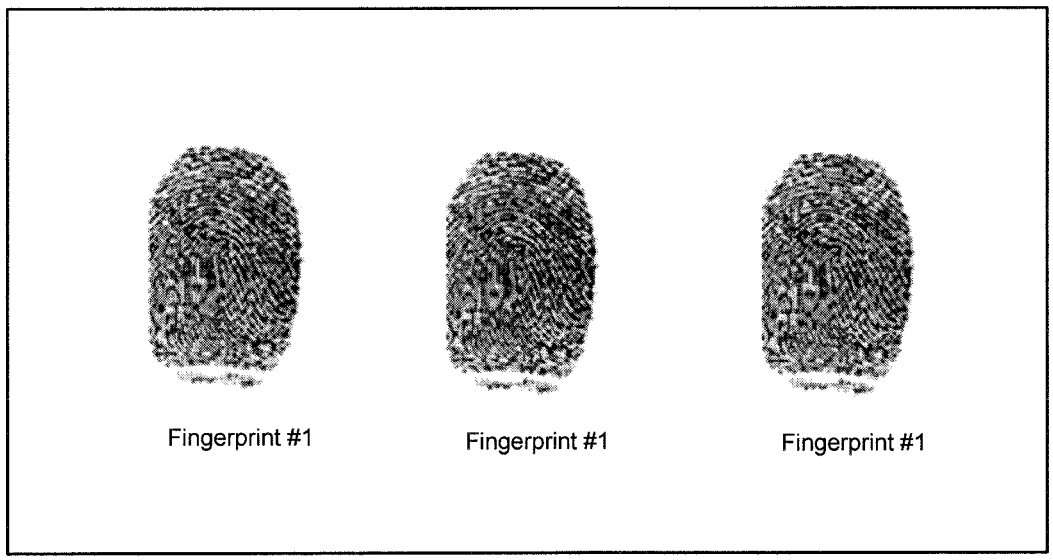

In various embodiments, and with reference to FIG. 6, the biometric passphrase may include a plurality of biometric data elements, such as a single fingerprint utilized in succession (e.g., a 3 digit pass phase of the user's right hand index finger, fingerprint #1; the user's right hand index finger, fingerprint #1; and the user's right hand index finger, fingerprint #1). For instance, the biometric data elements may be used multiple times within the same biometric passphrase. The speed at which the user enters the biometric data elements may be an element of a biometric passphrase. For instance, the total speed from the start of the entering of biometric data elements to the completion of the biometric data elements for the entire biometric passphrase may be an additional biometric passphrase constraint. For instance, the entire biometric passphrase may be entered above or below a predetermined amount of time. According to various embodiments, a duration between entering biometric data elements may be a factor of the biometric passphrase. For instance, a duration between biometric passphrase digits may be required to be above or below a threshold of a predetermined amount of time, such as, a half second, a second, and/or three second. In this way, access is grated based on unique identifiers to a particular user, entered in a style unique to that user. This timing threshold may also stymie hackers trying to enter multiple guesses as each pattern even though correctly guessed may have a different timing scheme. In these scenarios, a timer may be coupled to the biometric reader 135. The time between biometric passphrase digits and/or the entry of the complete biometric passphrase and/or a portion of the biometric passphrase may be based on a user's pre-saved entry and/or selected via a menu in authorization application during registration and/or updating of the biometric passphrase.

Figure 7:
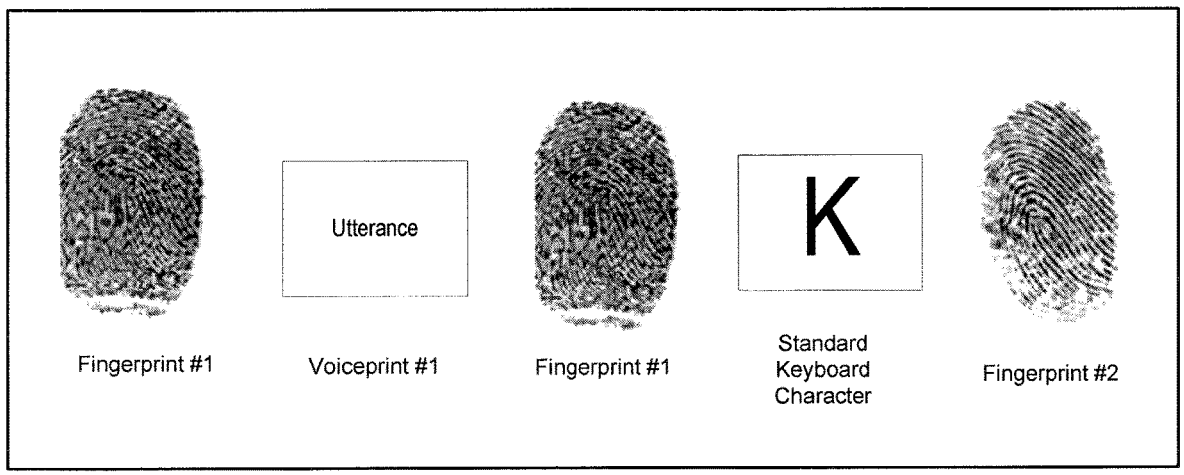

According to various embodiments, and with reference to FIG. 7, the biometric passphrase combinations may include multiple biometric data elements types. For example, a combination of fingerprints and spoken voice could become a passphrase. Further still, as depicted in FIG. 7, a passphrase may comprise a combination of fingerprints, spoken voice and keyboard characters. For instance, the biometric passphrase may include a plurality of biometric data elements, such as multiple biometric data elements in succession (e.g., a 5 digit pass phase of the user's right hand index finger, fingerprint #1; a voiceprint of a distinct utterance of the user, such as speaking the word "DOG", voiceprint #1; the user's right hand index finger, fingerprint #1; an case sensitive entry of a keyboard character, uppercase letter "K"; and the user's right hand index finger, fingerprint #2). The transaction application may verify the verification information against locally pre-stored biometric data element information. According to various embodiments, the biometric passphrase may not be stored locally on the PCD 130 and may be securely stored by a biometric database 115. The transaction application may verify the verification information against locally pre-stored biometric data element information.

According to various embodiments, the biometric passphrase may comprise a plurality of biometric characteristics may be captured by the system in concert with each other. For instance, a voice print may be uttered and recorded by a sensor, such as a microphone when a fingerprint is being read by a biometric reader 135, e.g., a finger print reader. Authorization may be based on the plurality of biometric data elements being received in concert with each other.

The biometric passphrase may authenticate the user to use the one or more transaction accounts in a transaction. In the scenario of multiple accounts, the biometric passphrase may be used to identify which account should be used to process the transaction request. This allows PCD 130 to store biometric passphrase for different types of accounts, such as, for example, credit, charge, debit, pre-paid, and loyalty accounts. As an example, data related to two accounts may exist on the PCD 130, each associated with a unique biometric passphrase and/or unique authorization data. In response to the authentication request, the accountholder/ user may decide which account should be used for the payment through the biometric passphrase and/or authorization data provided. If the biometric passphrase for the charge account is used, that account is used in the transaction request that is provided to the POS 140 reader. This approach affords a PCD 130 the ability of additional security of the account codes stored PCD 130 by requesting an explicit authentication of the account by the accountholder before the payment is consummated and/or in the initial transaction request initiation.

The payment processor may use preprogrammed logic to authorize the transaction. This pre-programmed logic may include identification of the customer, identification of account type (e.g. credit, debit, loyalty, pre-paid, charge, etc.) a verification that the account is in good standing (e.g. does not exceed credit limit, the account is not in arrears, there is enough balance in the prepaid account to cover the transaction, etc.)

If one or more of these criteria are not met, the transaction may be declined. If one or more of these criteria are met, the transaction may be confirmed and the payment processor may send an approval message to the POS 140 system. The transaction may then be consummated. In various embodiments, encrypted biometric data elements in the form of a presented passphrase may be verified locally at PCD 130 and the transfer of transaction information is not initiated until a match to the pre-stored biometric phase is made. Biometric data elements, such as inputted digitized fingerprint data may be encrypted (post input). Either the digitized fingerprint data or encrypted digitized fingerprint data may be compared with pre-stored (trusted) respective digitized fingerprint data or encrypted digitized fingerprint data locally or remotely. A confidence factor may be generated based on the comparison. In response to a match and/or association of high confidence factor being made (e.g., above a preset threshold, such as 90%), the transaction initiation may progress. If no match is made, an error signal may be communicated. In response to the error signal, a user may be requested to/elect try again. In various embodiments, in response to the comparison of the sequence of the plurality of biometric data elements with the registered biometric passphrase being below the threshold, the system may transmit a request for the user to provide a sequence of biometric data elements randomly selected from the dictionary of pre-stored biometric data elements of the user. For instance, the authorization system may request the user provide their right hand index fingerprint to a reader; a voiceprint of a distinct utterance of the user, such as speaking a previously saved word and/or the user provide their left hand pinky fingerprint to a reader.

Though not depicted, the device may match the inputted digitized fingerprint to a selection of pre-stored fingerprints and associate the inputted digitized fingerprint to a particular user and a particular user's transaction account. In this way, the digitized fingerprint data may act as an account selection identifier.

CAS 110 may receive the transaction request and create an approval or denial message. CAS 110 may detect a biometric passphrase in the transaction request. CAS 110 may compare the biometric passphrase in the transaction request with a pre-stored biometric passphrase associated with the user. In response to the biometric passphrase associated with the transaction request matching the appropriate pre-stored biometric passphrase, CAS 110 may generate an approval message and transmit the approval message to the merchant.

In various embodiments, the authorization system may transmit a transaction notification to PCD 130. The transaction notification may be sent within the authorization application. In various embodiments the transaction notification may be sent via a SMS, text, e-mail, or other method of communication. The transaction notification may include that the consumer confirm the transaction by clicking on a confirm button or by indicating their confirmation in any other manner. The transaction notification may request the consumer to enter a password or other verification information. In various embodiments, the CAS 110 may determine that the transaction was fraudulent based on the response from PCD 130.

Figure 8:
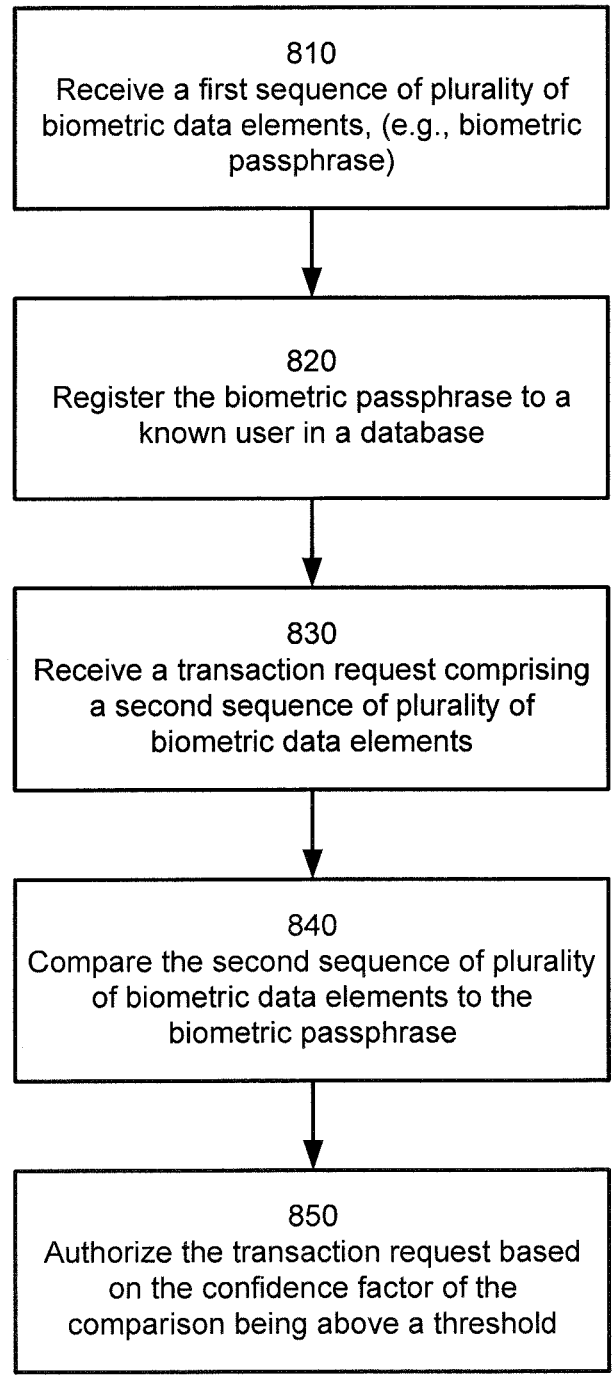
FIG. 8 depicts a method of utilizing a biometric passphrase according to various embodiments of the disclosure.

According to various embodiments, and with reference to FIG. 8, a method of authorizing a transaction may include receiving a first sequence of a plurality of biometric data elements, (e.g., biometric passphrase) (Step 810). These biometric data elements may be stored by a user's device or to a biometric data element database. For instance, the storing may include registering the biometric passphrase to a known user, having at least one transaction account, in a database (Step 820). The method may include receiving a transaction request comprising a second sequence of plurality of biometric data elements (Step 830). A comparison of the second sequence of plurality of biometric data elements to the biometric passphrase may be made (Step 840). The decision to authorize the transaction request may be based on a confidence factor of the comparison being above a threshold (Step 850).

Though the biometric passphrase has been described herein in association with the authorization of a transaction, it should be appreciated the qualities of the biometric passphrase may be utilized in concert with accessing an electronic device, being granted access, encrypting data, transferring value, verifying attendance, verifying identity, being granted physical access to a location, accessing data, and/or the like. Practitioners will appreciate that a single biometric passphrase may comprise at least 4 levels of security including the individualistic quality of each biometric data element, the sequencing of biometric data elements, the orientation of capture of the biometric characteristics, and the speed at which a biometric passphrase is entered.

Practitioners will appreciate that the systems and methods described herein, in addition to being used in the context of a merchant website, may similarly be used in the context of telephone purchases, mail order purchases, and any other purchasing scenario where face-to-face interaction is limited or nonexistent.

In various embodiments, a user may use the biometric passphrase to access their transaction account information. For example, when calling to make account inquiries or transactions over the phone, the user may be prompted to transmit the biometric passphrase as part of a verification process. The user may enter the biometric passphrase on their PCD 130 and communicate biometric passphrase to an operator or automated verification system. In response to the biometric passphrase matching a stored biometric passphrase, the consumer may be granted access to their account. In various embodiments, a transaction request may comprise a request to access transaction account information. When accessing transaction account information online, the consumer may be required to enter the biometric passphrase as part of the verification process.

Any communication, transmission and/or channel discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website, a uniform resource locator ("URL"), a document (e.g., a Microsoft Word document, a Microsoft Excel document, an Adobe .pdf document, etc.), an "ebook," an "emagazine," an application or microapplication (as described below), an SMS or other type of text message, an email, facebook, twitter, MMS and/or other type of communication technology. In various embodiments, a channel may be hosted or provided by a data partner. In various embodiments, the distribution channel and/or the may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include Facebook®, Foursquare®, Twitter®, MySpace®, LinkedIn®, and the like. Examples of affiliate or partner websites include American Express®, Groupon®, LivingSocial®, and the like. Moreover, examples of mobile device communications include texting, email, and mobile applications for smartphones.

A "consumer profile" or "consumer profile data" may comprise any information or data about a consumer that describes an attribute associated with the consumer (e.g., a preference, an interest, demographic information, personally identifying information, and the like).

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

Phrases and terms similar to an "entity" may include any individual, consumer, customer, group, business, organization, government entity, transaction account issuer or processor (e.g., credit, charge, etc.), merchant, consortium of merchants, account holder, charitable organization, software, hardware, and/or any other type of entity. The terms "user," "consumer," "purchaser," and/or the plural form of these terms are used interchangeably throughout herein to refer to those persons or entities that are alleged to be authorized to use a transaction account.

Phrases and terms similar to "account", "account number", "account code" or "consumer account" as used herein, may include any device, code (e.g., one or more of an authorization/access code, personal identification number ("PIN"), Internet code, other identification code, and/or the like), number, letter, symbol, digital certificate, smart chip, digital signal, analog signal, biometric or other identifier/indicia suitably configured to allow the consumer to access, interact with or communicate with the system. The account number may optionally be located on or associated with a rewards account, charge account, credit account, debit account, prepaid account, telephone card, embossed card, smart card, magnetic stripe card, bar code card, transponder, radio frequency card or an associated account.

The system may include or interface with any of the foregoing accounts, devices, and/or a transponder and reader (e.g. RFID reader) in RF communication with the transponder (which may include a fob), or communications between an initiator and a target enabled by near field communications (NFC). Typical devices may include, for example, a key ring, tag, card, cell phone, wristwatch or any such form capable of being presented for interrogation. Moreover, the system, computing unit or device discussed herein may include a "pervasive computing device," which may include a traditionally non-computerized device that is embedded with a computing unit.

The account number may be distributed and stored in any form of plastic, electronic, magnetic, radio frequency, wireless, audio and/or optical device capable of transmitting or downloading data from itself to a second device. A consumer account number may be, for example, a sixteen-digit account number, although each credit provider has its own numbering system, such as the fifteen-digit numbering system used by American Express. Each company's account numbers comply with that company's standardized format such that the company using a fifteen-digit format will generally use three-spaced sets of numbers, as represented by the number "0000 000000 00000". The first five to seven digits are reserved for processing purposes and identify the issuing bank, account type, etc. In this example, the last (fifteenth) digit is used as a sum check for the fifteen digit number. The intermediary eight-to-eleven digits are used to uniquely identify the consumer. A merchant account number may be, for example, any number or alpha-numeric characters that identify a particular merchant for purposes of account acceptance, account reconciliation, reporting, or the like.

In various embodiments, an account number and/or account code may identify a consumer. In addition, in various embodiments, a consumer may be identified by a variety of identifiers, including, for example, an email address, a telephone number, a cookie id, a radio frequency identifier (RFID), a biometric, and the like.

Phrases and terms similar to "transaction account" may include any account that may be used to facilitate a financial transaction.

Phrases and terms similar to "financial institution" or "transaction account issuer" may include any entity that offers transaction account services. Although often referred to as a "financial institution," the financial institution may represent any type of bank, lender or other type of account issuing institution, such as credit card companies, card sponsoring companies, or third party issuers under contract with financial institutions. It is further noted that other participants may be involved in some phases of the transaction, such as an intermediary settlement institution.

Phrases and terms similar to "business" or "merchant" may be used interchangeably with each other and shall mean any person, entity, distributor system, software and/or hardware that are a provider, broker and/or any other entity in the distribution chain of goods or services. For example, a merchant may be a grocery store, a retail store, a travel agency, a service provider, an on-line merchant or the like.

Phrases and terms similar to "merchant," "supplier" or "seller" may include any entity that receives payment or other consideration. For example, a supplier may request payment for goods sold to a buyer who holds an account with a transaction account issuer.

Phrases similar to a "payment processor" may include a company (e.g., a third party) appointed (e.g., by a merchant) to handle transactions. A payment processor may include an issuer, acquirer, authorizer and/or any other system or entity involved in the transaction process. Payment processors may be broken down into two types: front-end and back-end.

Front-end payment processors have connections to various transaction accounts and supply authorization and settlement services to the merchant banks' merchants. Back-end payment processors accept settlements from front-end payment processors and, via The Federal Reserve Bank, move money from an issuing bank to the merchant bank. In an operation that will usually take a few seconds, the payment processor will both check the details received by forwarding the details to the respective account's issuing bank or card association for verification, and may carry out a series of anti-fraud measures against the transaction. Additional parameters, including the account's country of issue and its previous payment history, may be used to gauge the probability of the transaction being approved. In response to the payment processor receiving confirmation that the transaction account details have been verified, the information may be relayed back to the merchant, who will then complete the payment transaction. In response to the verification being denied, the payment processor relays the information to the merchant, who may then decline the transaction.

Phrases similar to a "payment gateway" or "gateway" may include an application service provider service that authorizes payments for e-businesses, online retailers, and/or traditional brick and mortar merchants. The gateway may be the equivalent of a physical point of sale terminal located in most retail outlets. A payment gateway may protect transaction account details by encrypting sensitive information, such as transaction account numbers, to ensure that information passes securely between the customer and the merchant and also between merchant and payment processor.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., Windows NT, Windows 95/98/2000, Windows XP, Windows Vista, Windows 7, OS2, UNIX, Linux, Solaris, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as iPads, iMACs, and MacBooks, kiosks, terminals, point of sale (POS) devices and/or terminals, televisions, or any other device capable of receiving data over a network. A web-client may run Microsoft Internet Explorer, Mozilla Firefox, Google Chrome, Apple Safari, or any other of the myriad software packages available for browsing the internet.

Practitioners will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In various embodiments, access is through a network or the Internet through a commercially-available web-browser software package.

As those skilled in the art will appreciate, a web client includes an operating system (e.g., Windows NT, 95/98/2000/CE/Mobile, OS2, UNIX, Linux, Solaris, MacOS, PalmOS, etc.) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In various embodiments, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

In various embodiments, components, modules, and/or engines of the system may be implemented as microapplications or micro-apps. Micro-apps are typically deployed in the context of a mobile operating system, including for example, a Palm mobile operating system, a Windows mobile operating system, an Android Operating System, Apple iOS, a Blackberry operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/groups/SNS/cloud-computing/cloud-def-v15.doc (last visited Feb. 4, 2011), which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, or object-oriented structure and/or any other database configurations. Encryption may be performed by way of any of the techniques now available in the art or which may become available—e.g., Twofish, RSA, El Gamal, Schorr signature, DSA, PGP, PKI, GPG (GnuPG), and symmetric and asymmetric cryptosystems. The computers and/or PCD 130 discussed herein may provide a suitable website or other Internet-based graphical user interface which is accessible by users.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and the like. A server may include a web service that receives a request from a web server, the request including a URL (http://yahoo.com/stockquotes/ge) and an IP address (123.56.789.234). The web server retrieves the appropriate web pages and sends the data or applications for the web pages to the IP address. Web services are applications that are capable of interacting with other applications over a communication means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WebSphere MQTM (formerly MQSeries) by IBM, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As used herein, the term "end user", "consumer", "customer", "cardmember", "business" or "merchant" may be used interchangeably with each other, and each shall mean any person, entity, government organization, business, machine, hardware, and/or software. A bank may be part of the system, but the bank may represent other types of card issuing institutions, such as credit card companies, card sponsoring companies, or third party issuers under contract with financial institutions. It is further noted that other participants may be involved in some phases of the transaction, such as an intermediary settlement institution, but these participants are not shown.

Each participant is equipped with a computing device in order to interact with the system and facilitate online commerce transactions. The customer has a computing unit in the form of a personal computer, although other types of computing units may be used including laptops, notebooks, hand held computers, set-top boxes, cellular telephones, touch-tone telephones and the like. The merchant has a computing unit implemented in the form of a computer-server, although other implementations are contemplated by the system. The bank has a computing center shown as a main frame computer. However, the bank computing center may be implemented in other forms, such as a mini-computer, a PC server, a network of computers located in the same of different geographic locations, or the like. Moreover, the system contemplates the use, sale or distribution of any goods, services or information over any network having similar functionality described herein The merchant computer and the bank computer may be interconnected via a second network, referred to as a payment network. The payment network which may be part of certain transactions represents existing proprietary networks that presently accommodate transactions for credit cards, debit cards, and other types of financial/banking cards. The payment network is a closed network that is assumed to be secure from eavesdroppers. Exemplary transaction networks may include the American Express®, VisaNet® and the Veriphone® networks.

The electronic commerce system may be implemented at the customer and issuing bank. In an exemplary implementation, the electronic commerce system is implemented as computer software modules loaded onto the customer computer and the banking computing center. The merchant computer does not require any additional software to participate in the online commerce transactions supported by the online commerce system.

As will be appreciated by one of ordinary skill in the art, the system may be embodied as a customization of an existing system, an add-on product, a processing apparatus executing upgraded software, a stand alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A method, comprising:
   obtaining, by at least one computing device, a plurality of data elements corresponding to a plurality of biometric characteristics of a user;
   receiving, by the at least one computing device, a user-defined sequence of individual ones of the plurality of data elements for a registered biometric identifier;
   generating, by the at least one computing device, the registered biometric identifier based on the user-defined sequence;
   linking, by the at least one computing device, the registered biometric identifier to a transaction account associated with the user;
   receiving, by the at least one computing device, a transaction request comprising the transaction account and a transaction request biometric identifier;
   determining, by the at least one computing device, a speed associated with a user entering the transaction request biometric identifier; and
   authorizing the transaction request based at least in part on the speed being within a predefined threshold and based at least in part on the transaction request biometric identifier matching the registered biometric identifier stored in a database.

2. The method of claim 1, further comprising:
   generating, by the at least one computing device, a second registered biometric identifier based at least in part on a second user-defined sequence of the plurality of data elements; and
   linking, by the at least one computing device, the second registered biometric identifier to a second transaction account associated with the user.

3. The method of claim 1, wherein the plurality of biometric characteristics include at least one of a fingerprint, a facial scan, an ear scan, a vascular pattern, a DNA sample, a hand geometry, a typing style, or a voice sample.

4. The method of claim 1, wherein linking the registered biometric identifier with the transaction account comprises storing the registered biometric identifier in the database associated with the transaction account.

5. The method of claim 1, further comprising:
   receiving, by the at least one computing device, a request to modify the registered biometric identifier, the request including a user-defined configuration of the individual ones of the plurality of data elements;
   generating, by the at least one computing device, a modified biometric identifier based on the user-defined configuration; and
   linking, by the at least one computing device, the modified biometric identifier to the transaction account.

6. A system, comprising:
   at least one computing device; and
   at least one application executable on the at least one computing device, wherein, when executed, the at least one application causes the at least one computing device to at least:
      receive a transaction request including a transaction account associated with a user and a first biometric identifier provided by the user, the first biometric identifier including a plurality of data elements corresponding to a plurality of biometric characteristics of the user;
      determine an elapsed time associated with a user input of the plurality of data elements for the first biometric identifier;
      obtain a second biometric identifier from a database, the second biometric identifier being linked to the transaction account; and authorize the transaction request based at least in part on the elapsed time being within a predefined period of time and a comparison of the first biometric identifier with the second biometric identifier.

7. The system of claim 6, wherein the plurality of biometric characteristics comprise at least one of: a fingerprint, a facial scan, an ear scan, a vascular pattern, a DNA sample, a hand geometry, a typing style, or a voice sample.

8. The system of claim 6, wherein authorizing the transaction request is further based at least in part on at least one of: a quality of the plurality of data elements, an orientation of a capture of the plurality of biometric characteristics, or a sequencing of the plurality of data elements.

9. The system of claim 6, wherein, when executed, the at least one application causes the at least one computing device to at least generate a confidence factor based at least in part on the comparison of the first biometric identifier and the second biometric identifier, the transaction request being authorized in response to the confidence factor being within a predefined threshold.

10. The system of claim 6, wherein, when executed, the at least one application causes the at least one computing device to at least:
generate an authorization message in response to authorizing the transaction request; and
transmit the authorization message to a client device.

11. The system of claim 6, wherein, when executed, the at least one application causes the at least one computing device to at least:
receive a second plurality of data elements from a computing device associated with a user;
generate the second biometric identifier based on the second plurality of data elements and a user-defined configuration; and
associate the second biometric identifier with the transaction account.

12. A method, comprising:
receiving, by at least one computing device, a transaction request including a transaction account associated with a user and a first biometric identifier provided by the user, the first biometric identifier including a plurality of data elements corresponding to a plurality of biometric characteristics;
obtaining, by the at least one computing device, a second biometric identifier from a database, the second biometric identifier being linked to the transaction account;
determining, by the at least one computing device, an elapsed time corresponding to a user entering individual data elements of the first biometric identifier;
comparing, by the at least one computing device, the first biometric identifier with the second biometric identifier; and
authorizing, by the at least one computing device, the transaction request based at least in part on the first biometric identifier matching the second biometric identifier and the elapsed time being within a predefined period of time.

13. The method of claim 12, wherein the first biometric identifier and the second biometric identifier include a respective sequence of individual data elements of the plurality of data elements.

14. The method of claim 12, wherein the plurality of biometric characteristics comprise at least one of: a fingerprint, a facial scan, an ear scan, a vascular pattern, a DNA sample, a hand geometry, a typing style, or a voice sample.

15. The method of claim 12, further comprising:
generating, by the at least one computing device, a confidence score based at least in part on comparing the first biometric identifier with the second biometric identifier,
wherein authorizing the transaction request occurs in response to the confidence score meeting or exceeding a predefined threshold.

16. The method of claim 12, further comprising:
receiving, by the at least one computing device, a registration request including a second plurality of data elements corresponding to the plurality of biometric characteristics;
receiving, by the at least one computing device, a user-defined configuration of the second plurality of data elements; and
generating, by the at least one computing device, the second biometric identifier based at least in part on the user-defined configuration.

17. The method of claim 12, further comprising storing, by the at least one computing device, the second biometric identifier in the database associated with the transaction account.

18. The method of claim 12, wherein the first biometric identifier and the second biometric identifier include a sequence of individual data elements of the plurality of data elements, and the sequence comprises a combination of a voiceprint and a text character.

19. The method of claim 12, wherein the first biometric identifier and the second biometric identifier include a sequence of individual data elements of the plurality of data elements, and the sequence comprises a combination of a fingerprint and a text character.

* * * * *